US012589728B2

(12) United States Patent　　　　(10) Patent No.:　US 12,589,728 B2
Kubo et al.　　　　　　　　　　　　(45) Date of Patent:　Mar. 31, 2026

(54) CHARGING CONTROL SYSTEM FOR IN-VEHICLE BATTERY

(71) Applicant: SUBARU CORPORATION, Tokyo (JP)

(72) Inventors: Tatsuhiro Kubo, Tokyo (JP); Minoru Omori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 18/897,059

(22) Filed: Sep. 26, 2024

(65) Prior Publication Data

US 2025/0115233 A1　Apr. 10, 2025

(30) Foreign Application Priority Data

Oct. 5, 2023　(JP) ................................. 2023-173833

(51) Int. Cl.
　　*B60W 20/10*　　　(2016.01)
　　*B60W 20/13*　　　(2016.01)
　　*H02J 7/34*　　　(2006.01)
(52) U.S. Cl.
　　CPC ............. *B60W 20/13* (2016.01); *H02J 7/342* (2020.01); *B60W 2510/244* (2013.01); *B60W 2520/04* (2013.01); *B60W 2530/209* (2020.02)
(58) Field of Classification Search
　　CPC ................. B60W 20/10; B60W 20/13; B60W 2510/244; B60W 2520/04; B60W 2530/209; H02J 7/342
　　USPC ......................................................... 701/22
　　See application file for complete search history.

(56) References Cited

U.S. PATENT DOCUMENTS

| | | | |
|---|---|---|---|
| 11,563,338 B1 * | 1/2023 | Ambroziak ........... | B60L 53/305 |
| 11,567,503 B1 * | 1/2023 | Roy ....................... | G05D 1/028 |
| 12,392,843 B2 * | 8/2025 | K. V. ................. | G01R 31/3842 |
| 2011/0160019 A1 * | 6/2011 | Harada .................... | B60K 6/28 |
| | | | 180/65.265 |
| 2013/0103355 A1 * | 4/2013 | Unagami ................ | B60L 53/62 |
| | | | 702/187 |
| 2018/0012196 A1 * | 1/2018 | Ricci ..................... | A61B 5/1171 |
| 2020/0101850 A1 * | 4/2020 | Harty ...................... | B60L 55/00 |
| 2024/0067031 A1 * | 2/2024 | Meroux ................. | G06N 20/00 |
| 2024/0217387 A1 * | 7/2024 | Calabro .................. | B60L 53/68 |

FOREIGN PATENT DOCUMENTS

JP　　　　2016-52869 A　　4/2016

* cited by examiner

*Primary Examiner* — Jonathan L Sample
(74) *Attorney, Agent, or Firm* — Rimon P.C.

(57)　　　　　ABSTRACT

A charging control system for an in-vehicle battery is to be to be applied to a vehicle and includes a main battery, a sub battery, and a processor. The processor is configured to perform a first charging control and a second charging control. The processor is configured to: in the first charging control, charge the sub battery after a predetermined time is elapsed from time when the vehicle is placed into a traveling function stopped state; in the second charging control, start charging of the sub battery after a time shorter than the predetermined time of the first charging control is elapsed; and perform the second charging control when the processor determines, based on time data and position data of the vehicle, that the vehicle is placed into the traveling function stopped state at a predetermined location and within a predetermined time zone.

5 Claims, 3 Drawing Sheets

CHARGING CONTROL SYSTEM FOR IN-VEHICLE BATTERY

CROSS-REFERENCE TO RELATED APPLICATIONS

The present application claims priority from Japanese Patent Application No. 2023-173833 filed on Oct. 5, 2023, the entire contents of which are hereby incorporated by reference.

BACKGROUND

The disclosure relates to a charging control system for an in-vehicle battery.

A vehicle such as an electric vehicle or a hybrid vehicle includes a high-voltage main battery and a sub battery. The main battery supplies electric power to a driving motor. The sub battery supplies electric power to an auxiliary machine such as an electric device. The sub battery supplies the electric power at a lower voltage than the main battery. The main battery and the sub battery are coupled to each other via an electric circuit.

The vehicle including the main battery and the sub battery involves a decrease in an amount of charge of the sub battery due to standby electric power during parking. For example, if a user leaves the vehicle in his/her home parking space for a long time, the amount of charge of the sub battery can decrease and the sub battery can run out, making the vehicle difficult to start normally upon starting the vehicle. In order to prevent the battery from running out, some electric vehicles allow the electric power to be supplied from the main battery to the sub battery to charge the sub battery in a situation where the vehicle is parked for a long time.

For example, Japanese Unexamined Patent Application Publication No. 2016-52869 discloses a charging control apparatus that operates a DC-DC converter provided in an on-vehicle electric circuit to charge the sub battery, when: a vehicle is in a parked state in which a traveling function of the vehicle is stopped; and a predetermined period of time is elapsed. The DC-DC converter lowers a voltage of the main battery and supplies electric power to the sub battery. Charging the sub battery in the situation where the vehicle is parked for a long time and preventing the sub battery from running out make it possible to keep a supply of electric power from the sub battery normal upon starting the vehicle.

SUMMARY

An aspect of the disclosure provides a charging control system for an in-vehicle battery. The charging control system is configured to be applied to a vehicle. The charging control system includes a main battery, a sub battery, and a processor. The main battery is configured to perform a supply of electric power to a driving motor mounted on the vehicle. The sub battery is coupled to the main battery via an electric circuit and configured to be charged by the supply of the electric power from the main battery. The processor is configured to perform a first charging control and a second charging control. The processor is configured to: in the first charging control, operate the electric circuit and charge the sub battery after a predetermined time is elapsed from time when the vehicle is placed into a traveling function stopped state, the traveling function stopped state being a state of the vehicle in which a traveling function of the vehicle is stopped; in the second charging control, start charging of the sub battery after a time shorter than the predetermined time of the first charging control is elapsed; and perform the second charging control when the processor determines, based on time data and position data, that the vehicle is placed into the traveling function stopped state at a predetermined location set in advance and within a predetermined time zone, the position data being data on a position of the vehicle acquired by a position data acquirer.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
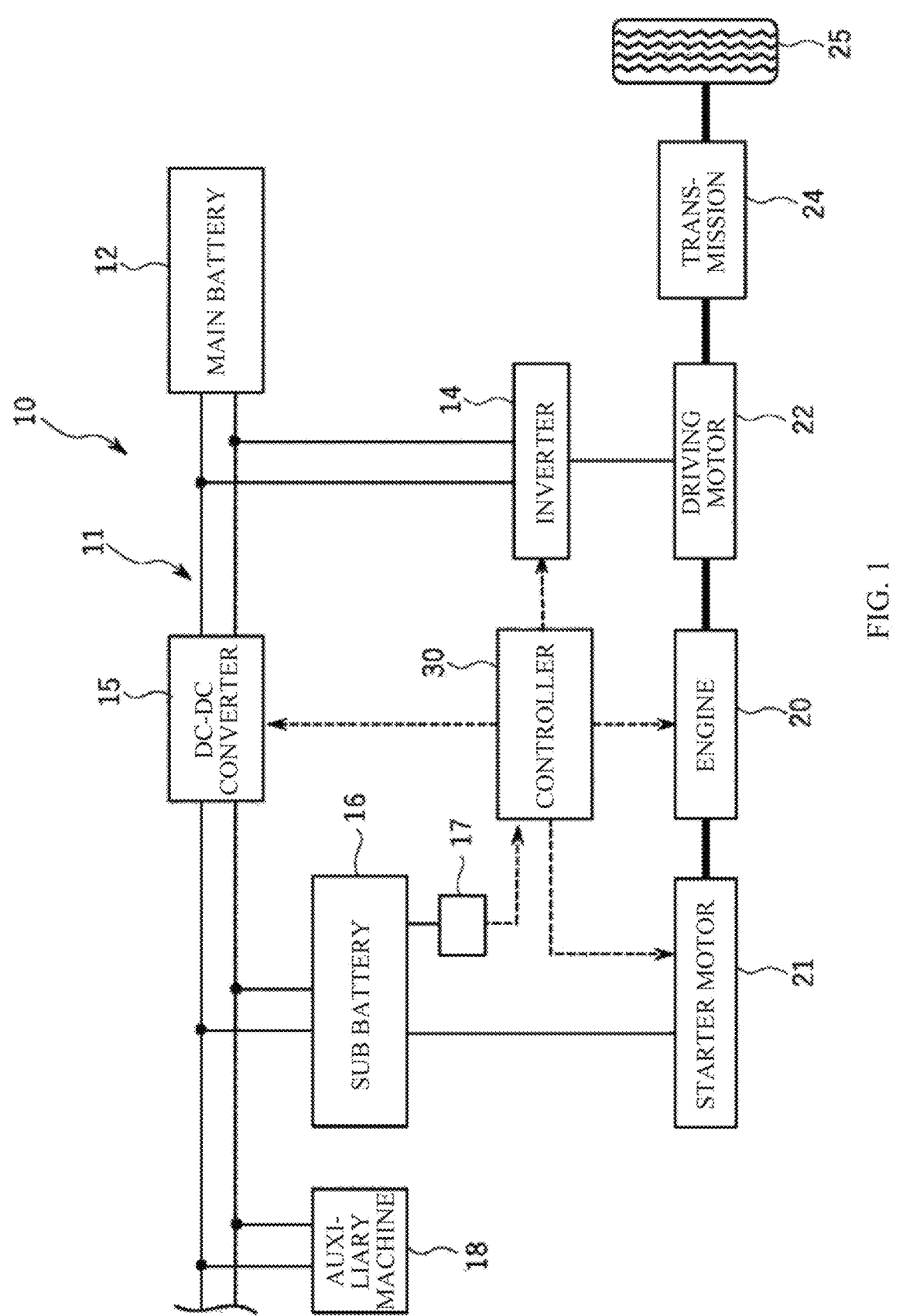
FIG. 1 is a block diagram illustrating a schematic configuration of a charging control system for an in-vehicle battery according to one example embodiment of the disclosure.

Charging of a sub battery in a parked state of a vehicle is generally so controlled that charging is halted when a user gets into the vehicle, from the viewpoint of preventing an event such as a theft. Accordingly, for example, when the user gets into the vehicle parked at home to pick up a baggage, the charging can be halted even though the charging is not sufficient, which can result in running out of the sub battery.

It is desirable to provide a charging control system for an in-vehicle battery which makes it possible to suppress running out of a sub battery in a parked state of a vehicle that includes a main battery and the sub battery.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
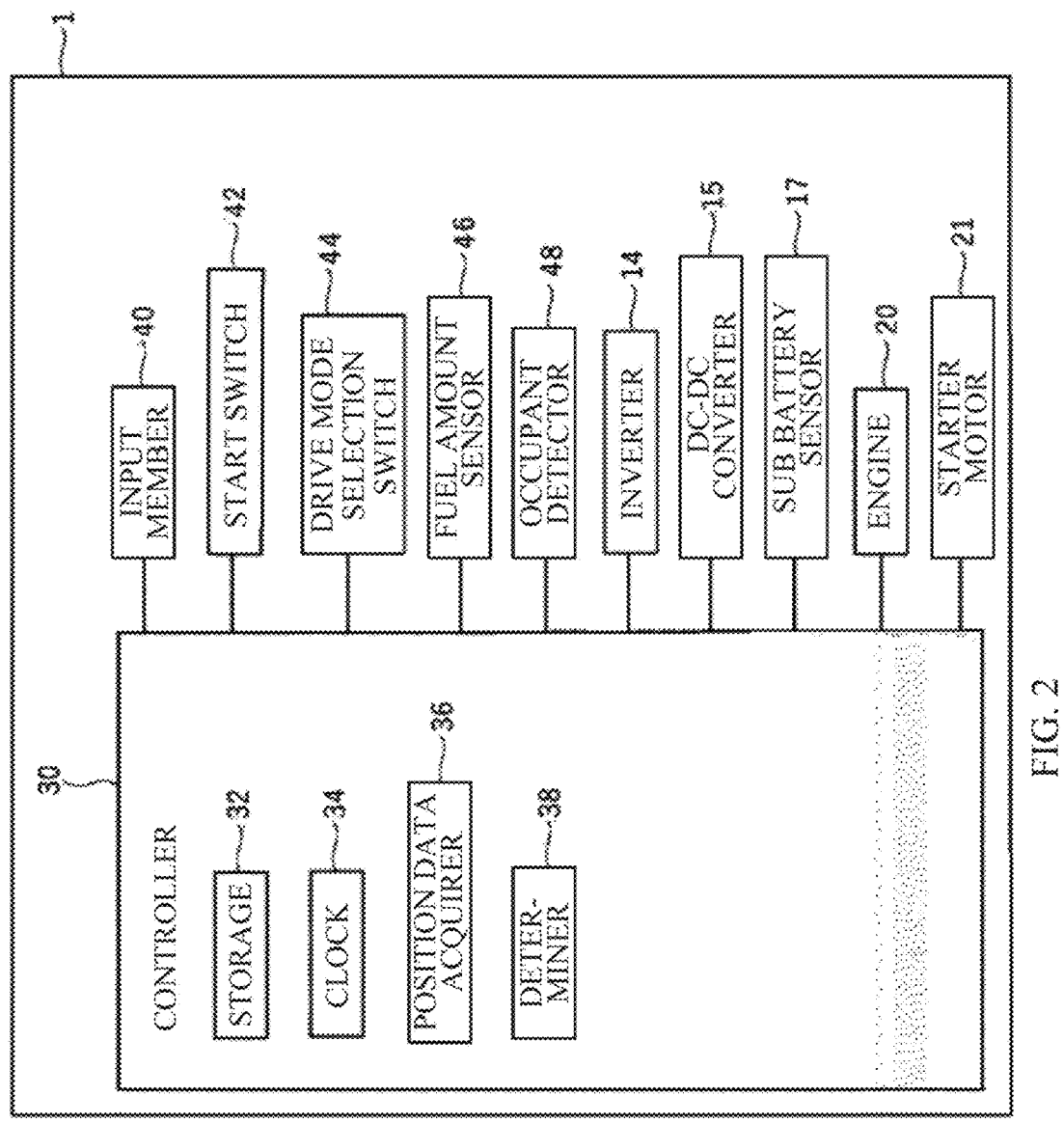
FIG. 2 is a block diagram illustrating a schematic configuration of a control mechanism of the charging control system.

FIG. 1 is a block diagram illustrating a schematic configuration of a charging control system for an in-vehicle battery 10 (hereinafter simply referred to as a "charging control system 10") according to an example embodiment of the disclosure. FIG. 2 is a block diagram illustrating a schematic configuration of a control mechanism of the charging control system 10. The charging control system 10 is applied to be applied to a vehicle 1. Non-limiting examples of the vehicle 1 may include an electric vehicle, a hybrid vehicle, and a plug-in hybrid vehicle. The vehicle 1 includes a high-voltage main battery 12 and a sub battery 16. The main battery 12 supplies electric power to a driving motor 22 mounted on the vehicle 1. The sub battery 16 may supply electric power to an auxiliary machine 18 such as an electric device. In the charging control system 10, the main battery 12 and the sub battery 16 are coupled via an electric circuit 11. The sub battery 16 is configured to be charged by a supply of electric power from the main battery 12. In the example embodiment, the charging control system 10 may be applied to a hybrid vehicle in which an engine 20 and the driving motor 22 are mounted as driving sources that cause the vehicle 1 to travel.

The vehicle 1 to which the charging control system 10 is to be applied may include, as a power transmission path, a starter motor 21, the engine 20, the driving motor 22, and a transmission 24. The transmission 24 may be coupled to drive wheels 25. The charging control system 10 may include the main battery 12, an inverter 14, a DC-DC converter 15, the sub battery 16, a sub battery sensor 17, the auxiliary machine 18, and a controller 30. These devices may be coupled via an electric circuit. The controller 30 is configured to control an operation of the vehicle 1. In one embodiment, the controller may serve as a "processor". Referring to FIG. 2, the charging control system 10 may include an input member 40, a start switch 42, a drive mode selection switch 44, a fuel amount sensor 46, and an occupant detector 48. These devices may be electrically coupled to the controller 30. Hereinafter, each component of the charging control system 10 will be described.

The starter motor 21 may be configured to start the engine 20, and is driven by the supply of electric power from the sub battery 16. The starter motor 21 may have an output shaft coupled to a crankshaft of the engine 20 via a gear. The power outputted from the starter motor 21 may be transmitted to the crankshaft of the engine 20. The starter motor 21 may also be driven by the electric power supplied from the main battery 12 via the DC-DC converter 15.

The engine 20 may be an internal combustion engine that generates the power using a fuel such as gasoline, and output the power that drives the drive wheels 25. The engine 20 may have an output shaft coupled to the driving motor 22 and the transmission 24 via unillustrated members including, for example, a torque converter and a clutch.

The driving motor 22 may be configured to output the power that drives the drive wheels 25. Non-limiting examples of the driving motor 22 may include a multi-phase AC motor. The transmission 24 may be configured to shift the rotation received from an output shaft of the driving motor 22 at a predetermined transmission ratio in accordance with a traveling state of the vehicle 1. Non-limiting examples of the transmission 24 may include a continuously variable transmission (CVT) configured to continuously change the transmission ratio. Non-limiting examples of the transmission 24 may also include a stepped transmission in which meshing of multiple transmission gears is changed to vary the transmission ratio stepwise.

The driving motor 22 may be coupled to the main battery 12 via the inverter 14, and generate the power by the electric power supplied from the main battery 12. The DC electric power discharged from the main battery 12 may be converted into the AC electric power by the inverter 14 and the thus-converted AC electric power may be supplied to the driving motor 22. The driving motor 22 may also serve as a generator that generates the electric power using a rotational energy of the drive wheels 25. The AC electric power generated by the driving motor 22 may be converted into the DC electric power by the inverter 14 and the thus-converted DC electric power may be supplied to the main battery 12. This makes it possible to charge the main battery 12.

The main battery 12 may store the electric power to be supplied to the driving motor 22, and have a higher voltage (e.g., 100 volts) than the sub battery 16. Non-limiting examples of the main battery 12 may include a secondary battery such as a lithium ion battery or a nickel hydrogen battery. The main battery 12 may be coupled to each device in the vehicle 1, such as the devices including the sub battery 16 and the auxiliary machine 18, via the DC-DC converter 15. The electric power stored in the main battery 12 may be stepped down by the DC-DC converter 15 and the thus-stepped down electric power may be supplied to each device.

The sub battery 16 may store the electric power to be supplied to the starter motor 21 and the auxiliary machine 18, and have a lower voltage (for example, 12 volts) than the main battery 12. Non-limiting examples of the sub battery 16 may include a secondary battery such as a lead-acid battery or a lithium-ion battery. The sub battery 16 may be coupled to the auxiliary machine 18 and the starter motor 21, and the electric power stored in the sub battery 16 may be supplied to the auxiliary machine 18 and the starter motor 21. Non-limiting examples of the auxiliary machine 18 may include an air conditioner and an acoustic device.

The sub battery sensor 17 may detect various state quantities of the sub battery 16 and output the detected state quantities to the controller 30. In the example embodiment, the sub battery sensor 17 may detect a voltage and a deterioration state (hereinafter, also referred to as State Of Health (SOH)) of the sub battery 16.

The input member 40 may allow a user to input information to the controller 30. Non-limiting examples of the input member 40 may include a touch panel. The user may set, by the input member 40, a predetermined location that serves as a reference of determination to be made by a determiner 38 in a later-described charging control of the sub battery 16. The predetermined location may be a location where the vehicle 1 is frequently parked. Non-limiting examples of the predetermined location may be user's home. Position data of the location set by the input member 40 may be stored in a storage 32 of the controller 30.

The start switch 42 may be configured to start a traveling control system that controls a device such as a powertrain of the vehicle 1. For example, when the user presses the start switch 42 installed in the vehicle 1 while depressing a brake pedal, a signal indicating a ReadyON may be transmitted to the controller 30. This starts the traveling control system and controls the vehicle 1 to a travelable state, i.e., ReadyON. When the user presses the start switch 42 while depressing the brake pedal with the vehicle 1 being in the travelable state, a signal indicating ReadyOFF may be transmitted to the controller 30. This stops the traveling control system and controls the vehicle 1 to a traveling function stopped state, i.e., ReadyOFF.

The drive mode selection switch 44 may switch a traveling mode of the vehicle 1 between a normal mode and eco mode. The normal mode may emphasize an occupant's comfort. The eco mode may emphasize a fuel consumption performance and an electric power consumption performance to allow a cruising distance of the vehicle 1 to be increased more than in the normal mode. Note that the modes selectable by the drive mode selection switch 44 are not limited to these modes, and may have a mode such as a power mode in which the acceleration upon an accelerator operation is increased as compared with the acceleration in the normal mode.

The fuel amount sensor 46 may detect a remaining amount of fuel of the engine 20 stored in a fuel tank, and output a result of the detection to the controller 30. The occupant detector 48 may detect whether a person is in the vehicle 1, and output a result of the detection to the controller 30. Non-limiting examples of the occupant detector 48 may include an in-vehicle camera.

In some embodiments, the controller 30 may be an electronic control unit (ECU). The ECU may have devices including: an arithmetic processing circuit that performs various arithmetic processing related to the traveling control of the vehicle 1; a memory in which a control program and data are stored; and an input/output interface. The controller 30 may control the driving of the engine 20 and the driving motor 22, and control the inverter 14 to adjust an amount of transfer of the electric power between the driving motor 22 and the main battery 12. This makes it possible to control a rotational speed and a torque of the driving motor 22, or to start the engine 20 by activating the starter motor 21. The controller 30 may control the DC-DC converter 15 to lower the voltage of the main battery 12 and supply the electric power at the lowered voltage to each device. The controller 30 may include the storage 32, a clock 34, a position data acquirer 36, and the determiner 38.

The storage 32 of the controller 30 may store, for example, various programs designed to execute data processing. In the example embodiment, the storage 32 may store a charge control program that allows the electric power to be supplied from the main battery 12 and allows the sub battery 16 to be charged in a situation where the vehicle 1 is in the traveling function stopped state. In the example embodiment, the charge control of the sub battery 16 includes a first charging control and a second charging control. In the first charging control, the electric circuit 11 is operated and the sub battery 16 is charged by the supply of the electric power from the main battery 12, after a predetermined time is elapsed with the traveling function stopped state being maintained from the time when the vehicle 1 is placed into the traveling function stopped state, e.g., after the start switch 42 is turned off. In the second charging control, the charging of the sub battery 16 is started after a time shorter than the predetermined time of the first charging control is elapsed, when a predetermined requirement is satisfied after the vehicle 1 is placed into the traveling function stopped state.

Note that, in the first charging control, the predetermined time for a start of the charging of the sub battery 16 is not limited to a certain time. In some embodiments, the predetermined time may be so set as to change in accordance with, for example, the deterioration state (SOH) of the sub battery 16. In some embodiments, the predetermined time may be so set that the predetermined time becomes shorter as the SOH becomes higher. In some embodiments, in the second charging control, the charging may be so set in advance that, in accordance with a change in the predetermined time of the first charging control, the charging is started in a shorter time than the predetermined time of the first charging control in which the change is made.

The controller 30 may stop the operation of the electric circuit 11 and stop the charging of the sub battery 16, when the occupant detector 48 detects that a person has entered a vehicle compartment during the charging of the sub battery 16 by the first charging control or the second charging control. In some embodiments, the operation and stopping of the electric circuit 11 may be performed, by an ON/OFF operation of an unillustrated switch provided between the main battery 12 and the sub battery 16.

The storage 32 may contain data on a predetermined threshold that serves as a reference of switching between the first charging control and the second charging control. In the example embodiment, the storage 32 may contain pieces of data on: a fuel threshold Fth as a threshold of a fuel quantity of the engine 20; a voltage threshold Vth as a threshold of the voltage of the sub battery 16; and a SOH threshold Hth as a threshold of the deterioration state (SOH) of the sub battery 16.

The clock 34 may count time. The position data acquirer 36 may be a position detector such as a GPS receiver, and acquire position data of the vehicle 1. The determiner 38 may determine whether the vehicle 1 is placed into the traveling function stopped state at a predetermined location within a predetermined time zone, based on time data acquired by the clock 34 and the position data of the vehicle 1 acquired by the position data acquirer 36, when the start switch 42 is switched from an ON state to an OFF state. The user may set the predetermined time in advance by the input member 40. In some embodiments, the controller 30 may calculate a main time zone in which the vehicle 1 is parked in accordance with a usage state of the vehicle 1 by the user, and the thus-calculated parking time zone may be set as the predetermined time zone. The user may set the predetermined location in advance by the input member 40. The predetermined location may be a location where the user usually parks the vehicle 1. In some embodiments, the predetermined location may be the user's home.

Next, the charging control of the sub battery 16 to be performed by the above-described charging control system 10 when the vehicle 1 is in the traveling function stopped state will be described with reference to an example flowchart illustrated in FIG. 3.

The controller 30 may start the charge control program of the sub battery 16, when the start switch 42 is switched from the ON state to the OFF state and the vehicle 1 is switched from the travelable state to the traveling function stopped state. The controller 30 may acquire, by the clock 34, the time at which the start switch 42 is switched to the OFF state, and acquire, by the position data acquirer 36, the position data of the vehicle 1 at the time when the start switch 42 is switched to the OFF state. The determiner 38 of the controller 30 may determine whether the vehicle 1 is placed into the traveling function stopped state at the predetermined location set in advance within the predetermined time zone, based on the acquired time data and the acquired position data of the vehicle 1 (step S11).

If the determiner 38 determines that a location where the vehicle 1 is placed into the traveling function stopped state is not the predetermined location or that the time at which the vehicle 1 is placed into the traveling function stopped state is outside the predetermined time zone (step S11: No), the process may proceed to step S12, and the controller 30 may execute the first charging control. In the first charging control, the charging of the sub battery 16 is started after the predetermined time set in advance is elapsed from the time when the vehicle 1 is placed into the traveling function stopped state.

If the determiner 38 determines that the location where the vehicle 1 is placed into the traveling function stopped state is the predetermined location and that the time at which the traveling function stopped state is placed is within the predetermined time zone (step S11: Yes), the process may proceed to step S13. In some embodiments, the predetermined location may refer to a set location (or a set point) and the vicinity thereof. For example, if the home address of the user is set, the determiner 38 may determine that the vehicle 1 is placed into the traveling function stopped state at the predetermined location, when the vehicle 1 is placed into the traveling function stopped state at the home or the vicinity thereof.

In step S13, the determiner 38 of the controller 30 may determine whether the remaining amount of fuel of the engine 20 is equal to or less than the predetermined threshold Fth, based on an output signal from the fuel amount sensor 46. In addition, in step S13, the determiner 38 may determine whether the eco mode that increases the cruising distance as compared with the normal mode is selected as the traveling mode, based on an output signal from the drive mode selection switch 44.

In step S13, if the determiner 38 determines that the remaining amount of fuel exceeds the predetermined threshold Fth and a traveling mode other than the eco mode is selected (step S13: Yes), the process may proceed to step S15, and the controller 30 may execute the second charging control. In the second charging control, after the vehicle 1 is placed into the traveling function stopped state, the charging of the sub battery 16 is started after a time shorter than the predetermined time of the first charging control is elapsed.

In step S13, if the determiner 38 determines that the remaining amount of fuel is equal to or less than the predetermined threshold Fth or the traveling mode is the eco mode (step S13: No), the controller 30 may determine whether the voltage of the sub battery 16 is equal to or less than the predetermined threshold Vth, based on an output signal from the sub battery sensor 17. In addition, the controller 30 may determine whether the SOH of the sub battery 16 is equal to or less than the predetermined threshold Hth (step S14).

In step S14, if the voltage of the sub battery 16 is equal to or less than the predetermined threshold Vth or the SOH of the sub battery 16 is equal to or less than the predetermined threshold Hth (step S14: Yes), the process may proceed to step S15, and the controller 30 may execute the second charging control. In step S14, if the voltage of the sub battery 16 exceeds the predetermined threshold Vth and the SOH of the sub battery 16 exceeds the predetermined threshold Hth (step S14: No), the process may proceed to step S12, and the controller 30 may execute the first charging control.

Figure 3:
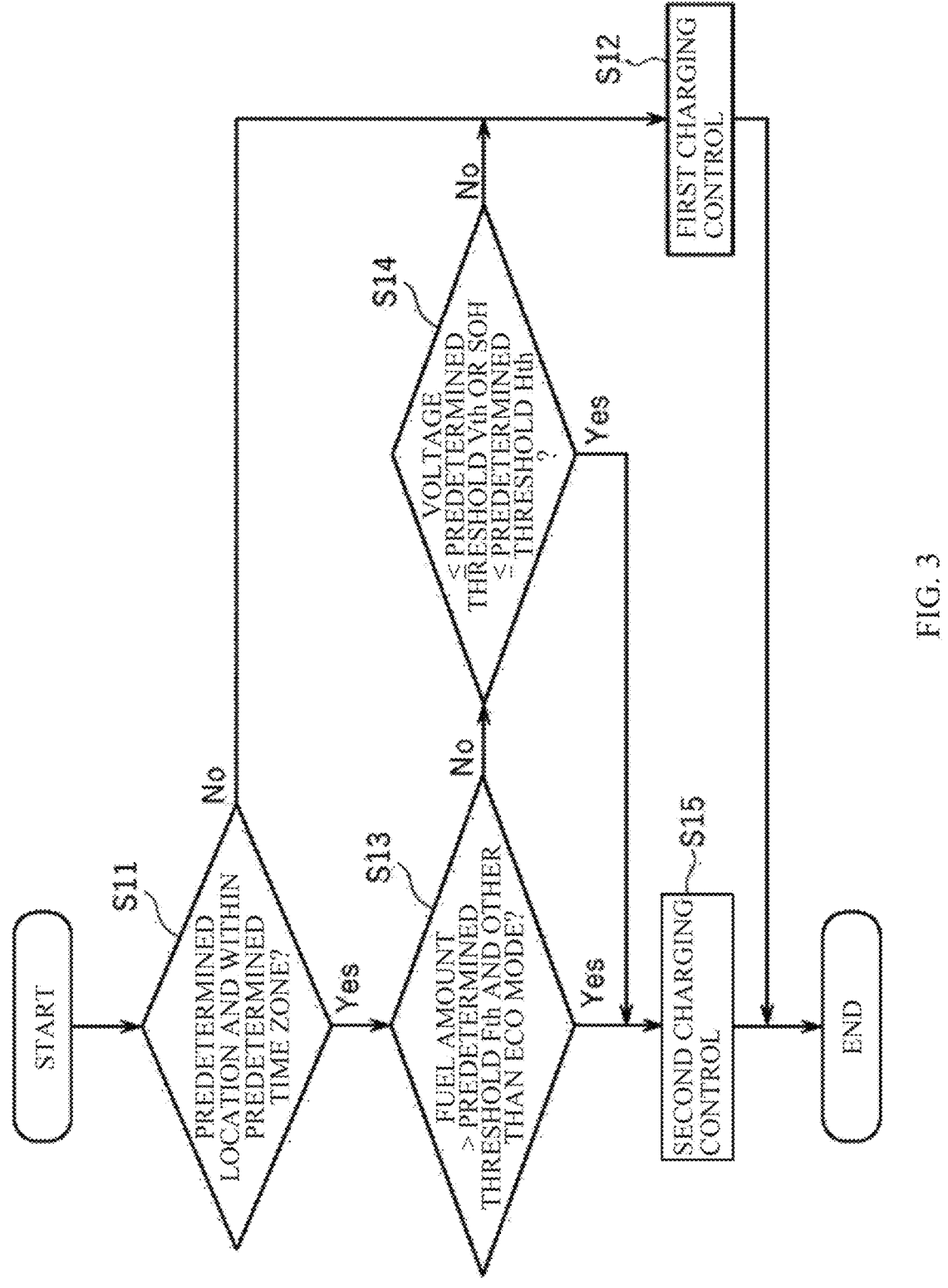
FIG. 3 is a flowchart illustrating an example of an operation of the charging control system.

The controller 30 may end (END) the control when the occupant detector 48 detects that a person has entered the vehicle compartment in the situation where the charging control of the sub battery 16 illustrated in FIG. 3 is performed. Thereafter, when the occupant detector 48 detects that there is no occupant, the controller 30 may return the process to the start and start the charging control of the sub battery 16 again.

In the charging control system 10, the charging control that charges the sub battery 16 in a situation where the vehicle 1 is in the traveling function stopped state, e.g., in the parked state, is selected from at least two charging control patterns including the first charging control and the second charging control. The first charging control starts the charging after the predetermined time is elapsed from the time when the vehicle 1 is parked. The second charging control starts the charging in a time shorter than the predetermined time. The user of the vehicle 1 generally parks the vehicle 1 in a specific location or a specific time zone, such as parking the vehicle 1 in a parking space at home at night. Accordingly, selecting the second charging control helps to charge the sub battery 16 at an early stage and to suppress the running out of the sub battery 16 in an example case where: the user's home is set as the predetermined location; the time zone in which the vehicle is normally parked at home is set as the predetermined zone; and the user parks the vehicle 1 in a normal time zone in a parking space at home.

The charging of the sub battery 16 during the parking of the vehicle 1 may be controlled to be halted when the user gets into the vehicle 1 from a viewpoint of preventing an event such as a theft of the vehicle 1. Accordingly, an existing charging control can involve running out of the sub battery because the charging is not started at a timing at which the charging is necessary or halted even though the charging is not sufficient, even when the user gets into the vehicle parked at home to pick up a baggage. The charging control system 10 according to the example embodiment, however, selects the second charging control, which helps to charge the sub battery 16 with a margin at an early stage and to appropriately suppress the running out of the sub battery 16 during the parking.

In some embodiments, the first charging control may be selected when the fuel amount of the engine 20 is equal to or less than the predetermined threshold Fth and the fuel amount is small, even when it is determined that the vehicle 1 is placed into the traveling function stopped state at the predetermined location within the predetermined time zone. This configuration helps to suppress a decrease in an amount of electric power of the main battery 12 resulting from the supply of electric power from the main battery 12 to the sub battery 16. If the amount of electric power of the main battery 12 decreases, the starting frequency of the engine 20 increases upon the next traveling of the vehicle 1 and the fuel consumption deteriorates. In such a situation, the first charging control may be performed instead of the second charging control, which helps to suppress the consumption of fuel or to improve a comfort by suppressing a noise caused by the use of the engine 20.

In some embodiments, the first charging control may be performed when the eco mode is selected, e.g., when the mode that emphasizes the fuel consumption performance and the electric power consumption is selected, even when it is determined that the vehicle 1 is placed into the traveling function stopped state at the predetermined location within the predetermined time zone. This configuration helps to suppress the electric power consumption of the main battery 12 or an amount of fuel consumption upon the next traveling of the vehicle 1.

The sub battery 16 can run out when the voltage of the sub battery 16 is lowered or the sub battery 16 is deteriorated, even when, in step S12, the fuel amount of the engine 20 is equal to or less than the predetermined threshold Fth or the eco mode is selected. For example, if the first charging control is constantly selected if the user of the vehicle 1 preferentially uses the eco mode, the standby time until the sub battery 16 is charged becomes long, which can result in running out of the sub battery 16. Accordingly, in some embodiments, the second charging control is performed when the voltage of the sub battery 16 is equal to or less than the predetermined threshold Vth or the SOH of the sub battery 16 is equal to or less than the predetermined threshold Hth, even when the amount of fuel of the engine 20 is equal to or less than the predetermined threshold Fth or the eco mode is selected. This configuration helps to charge the sub battery 16 at an early stage and appropriately suppress the running out of the sub battery 16.

The charging control system 10 according to at least one embodiment of the disclosure thus makes it possible to suppress running out of the sub battery 16 in a parked state of the vehicle 1 that includes the main battery 12 and the sub battery 16.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

In some embodiments, the determination to be made in step S13 based on the remaining amount of fuel of the engine 20 may be omitted, when the charging control system 10 is to be applied to an electric vehicle that is not equipped with the engine 20.

In some embodiments, the charging control system 10 may be configured to execute the second charging control without performing steps S13 and S14, when the vehicle 1 is placed into the traveling function stopped state at the predetermined location within the predetermined time zone in step S11 of the flow chart illustrated by way of example in FIG. 3. In some embodiments, the charging control system 10 may be configured to execute the first charging control without performing step S14, when the fuel amount of the engine 20 is equal to or less than the predetermined threshold Fth or the traveling mode is the eco mode in step S13 following step S11. In some embodiments, the charging control system 10 may be configured to execute the second charging control, when one or both of the fuel amount of the engine 20 exceeding the predetermined threshold Fth and the driving mode being other than the eco mode are satisfied in step S13 following step S11, and otherwise execute the first charging control or shift to step S14.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The controller 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller illustrated in FIG. 1.

The invention claimed is:

1. A charging control system for an in-vehicle battery, the charging control system being configured to be applied to a vehicle, the charging control system comprising:
   a main battery configured to perform a supply of electric power to a driving motor mounted on the vehicle;
   a sub battery coupled to the main battery via an electric circuit and configured to be charged by the supply of the electric power from the main battery; and
   a processor configured to perform a first charging control and a second charging control, wherein
   the processor is configured to:
   in the first charging control, operate the electric circuit and charge the sub battery after a predetermined time is elapsed from time when the vehicle is placed into a traveling function stopped state, the traveling function stopped state being a state of the vehicle in which a traveling function of the vehicle is stopped;
   in the second charging control, start charging of the sub battery after a time shorter than the predetermined time of the first charging control is elapsed; and
   perform the second charging control when the processor determines, based on time data and position data, that the vehicle is placed into the traveling function stopped state at a predetermined location set in advance and within a predetermined time zone, the position data being data on a position of the vehicle acquired by a position data acquirer.

2. The charging control system for the in-vehicle battery according to claim 1, wherein
   the vehicle comprises an engine, and
   the processor is configured to
   perform the first charging control when: the processor determines that the vehicle is placed into the traveling function stopped state at the predetermined location and within the predetermined time zone; and a fuel amount of the engine is equal to or less than a predetermined threshold, and
   perform the second charging control when: the processor determines that the vehicle is placed into the traveling function stopped state at the predetermined location and within the predetermined time zone; and the fuel amount of the engine exceeds the threshold.

3. The charging control system for the in-vehicle battery according to claim 2, wherein the processor is configured to perform the second charging control when: the processor determines that the vehicle is placed into the traveling function stopped state at the predetermined location and within the predetermined time zone; the fuel amount of the engine is equal to or less than the threshold; and a voltage of the sub battery is equal to or less than a predetermined threshold or a deterioration state of the sub battery is equal to or less than a predetermined threshold.

4. The charging control system for the in-vehicle battery according to claim 1, wherein the processor is configured to perform the first charging control when: the processor determines that the vehicle is placed into the traveling function stopped state at the predetermined location and within the predetermined time zone; and a traveling mode of the vehicle before the vehicle is placed into the traveling function stopped state is an eco mode, the eco mode being configured to increase a cruising distance of the vehicle as compared with a normal mode comprised in the traveling mode, and perform the second charging control when: the processor determines that the vehicle is placed into the traveling function stopped state at the predetermined location and within the predetermined time zone; and the traveling mode is not the eco mode.

5. The charging control system for the in-vehicle battery according to claim 4, wherein the processor is configured to perform the second charging control when: the processor determines that the vehicle is placed into the traveling function stopped state at the predetermined location and within the predetermined time zone; the traveling mode is the eco mode; and a voltage of the sub battery is equal to or less than a predetermined threshold or a deterioration state of the sub battery is equal to or less than a predetermined threshold.

* * * * *